US011345041B2

(12) United States Patent
Shimizu et al.

(10) Patent No.: US 11,345,041 B2
(45) Date of Patent: May 31, 2022

(54) ROBOT DEVICE, METHOD OF CONTROLLING THE SAME, COMPUTER PROGRAM, AND ROBOT SYSTEM

(71) Applicant: Sony Corporation, Tokyo (JP)

(72) Inventors: Satoru Shimizu, Tokyo (JP); Kenta Kawamoto, Tokyo (JP); Yoshiaki Iwai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 70 days.

(21) Appl. No.: 16/391,317

(22) Filed: Apr. 23, 2019

(65) Prior Publication Data

US 2019/0248017 A1    Aug. 15, 2019

Related U.S. Application Data

(63) Continuation of application No. 15/868,519, filed on Jan. 11, 2018, now Pat. No. 10,293,487, which is a (Continued)

(30) Foreign Application Priority Data

Jul. 25, 2011    (JP) ................................ 2011-161550

(51) Int. Cl.
*B25J 9/00* (2006.01)
*B25J 9/16* (2006.01)
*G05D 1/02* (2020.01)

(52) U.S. Cl.
CPC ........... *B25J 9/1697* (2013.01); *B25J 9/1679* (2013.01); *G05D 1/0246* (2013.01);
(Continued)

(58) Field of Classification Search
CPC ............ B60G 17/0195; B60R 16/0315; B60T 8/1755; B60W 10/06; B60W 10/20
See application file for complete search history.

(56) References Cited

U.S. PATENT DOCUMENTS 6,269,692 B1    8/2001    Drexel et al.
6,470,301 B1    10/2002    Barral
(Continued)

FOREIGN PATENT DOCUMENTS

JP    3738254 B2    1/2006
JP    2007-152443 A    6/2007
JP    2008-304268 A    12/2008

*Primary Examiner* — Ian Jen
(74) *Attorney, Agent, or Firm* — Xsensus LLP

(57) ABSTRACT

Provided is a robot device including an image input unit for inputting an image of surroundings, a target object detection unit for detecting an object from the input image, an object position detection unit for detecting a position of the object, an environment information acquisition unit for acquiring surrounding environment information of the position of the object, an optimum posture acquisition unit for acquiring an optimum posture corresponding to the surrounding environment information for the object, an object posture detection unit for detecting a current posture of the object from the input image, an object posture comparison unit for comparing the current posture of the object to the optimum posture of the object, and an object posture correction unit for correcting the posture of the object when the object posture comparison unit determines that there is a predetermined difference or more between the current posture and the optimum posture.

18 Claims, 14 Drawing Sheets

ROBOT DEVICE 100

Related U.S. Application Data continuation of application No. 15/258,436, filed on Sep. 7, 2016, now Pat. No. 9,908,241, which is a continuation of application No. 14/242,319, filed on Apr. 1, 2014, now Pat. No. 9,463,575, which is a continuation of application No. 13/545,628, filed on Jul. 10, 2012, now Pat. No. 8,751,048.

(52) U.S. Cl.
CPC . *G05D 1/0274* (2013.01); *G05B 2219/37618* (2013.01); *G05B 2219/39478* (2013.01); *G05B 2219/39517* (2013.01); *Y10S 901/01* (2013.01); *Y10S 901/47* (2013.01)

(56) References Cited

U.S. PATENT DOCUMENTS

| | | | |
|---|---|---|---|
| 6,526,373 | B1 | 2/2003 | Barral |
| 7,206,668 | B2 | 4/2007 | Okamoto et al. |
| 2004/0073360 | A1 | 4/2004 | Foxlin |
| 2004/0128028 | A1 | 7/2004 | Miyamoto et al. |
| 2004/0167667 | A1 | 8/2004 | Goncalves et al. |
| 2005/0102246 | A1* | 5/2005 | Movellan ............... G06N 3/004 706/12 |
| 2005/0182518 | A1 | 8/2005 | Karlsson |
| 2005/0234679 | A1 | 10/2005 | Karlsson |
| 2006/0008136 | A1 | 1/2006 | Leroux |
| 2006/0112034 | A1* | 5/2006 | Okamoto ............. G05D 1/0251 706/16 |
| 2007/0010913 | A1 | 1/2007 | Miyamoto et al. |
| 2007/0150105 | A1 | 6/2007 | Orita et al. |
| 2007/0192910 | A1 | 8/2007 | Vu et al. |
| 2007/0265741 | A1 | 11/2007 | Oi et al. |
| 2008/0009965 | A1 | 1/2008 | Bruemmer et al. |
| 2008/0009968 | A1 | 1/2008 | Bruemmer et al. |
| 2009/0326713 | A1 | 12/2009 | Moriya |
| 2010/0057257 | A1 | 3/2010 | Ichikawa |
| 2010/0222924 | A1 | 9/2010 | Gienger et al. |
| 2011/0040427 | A1 | 2/2011 | Ben-Tzvi |
| 2011/0054689 | A1 | 3/2011 | Nielsen et al. |
| 2011/0141485 | A1 | 6/2011 | Lee et al. |
| 2011/0208745 | A1 | 8/2011 | Dietsch et al. |
| 2012/0072052 | A1 | 3/2012 | Powers et al. |
| 2012/0095619 | A1 | 4/2012 | Pack et al. |
| 2012/0121161 | A1 | 5/2012 | Eade et al. |
| 2012/0290132 | A1 | 11/2012 | Kokubo et al. |
| 2013/0026148 | A1 | 1/2013 | Aoyama et al. |
| 2014/0074291 | A1 | 3/2014 | Emoto et al. |
| 2015/0356367 | A1* | 12/2015 | Han ....................... G06K 9/34 382/159 |

* cited by examiner

FIG.1
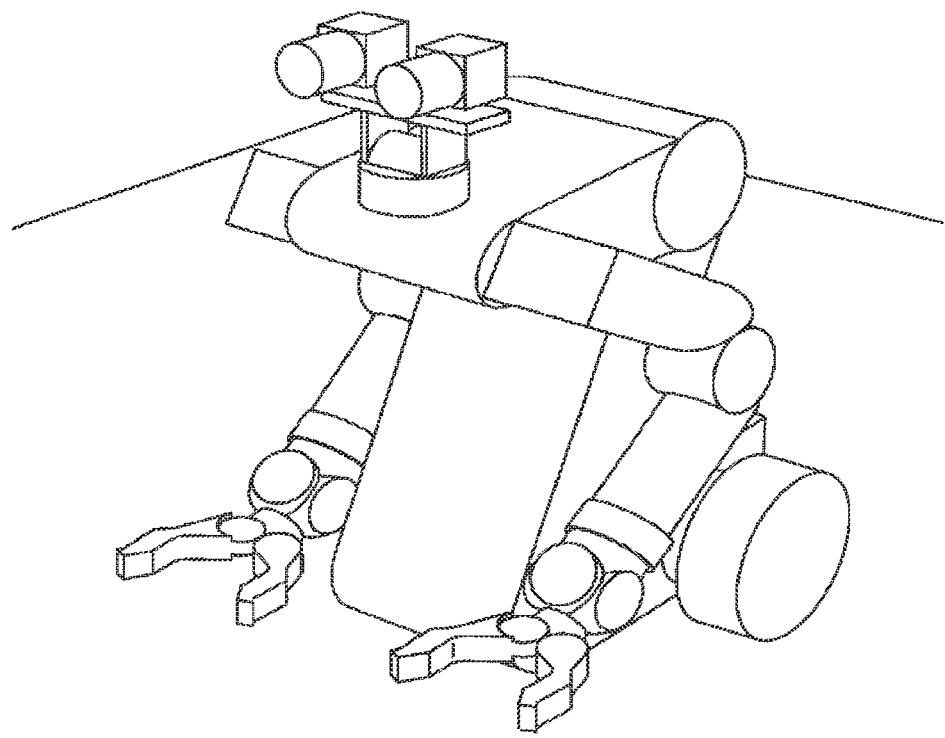
ROBOT DEVICE 100

ROBOT DEVICE 100

FIG.6
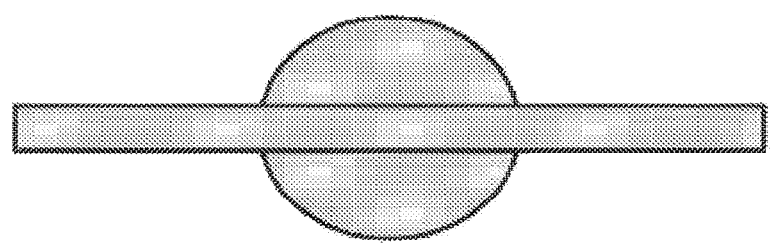
TV
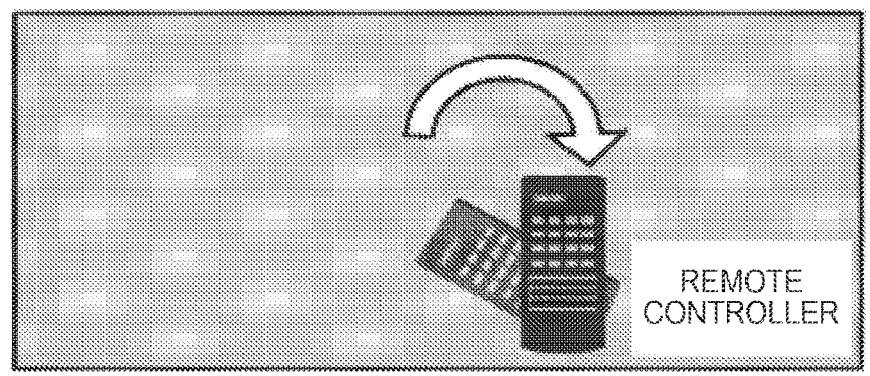
TABLE
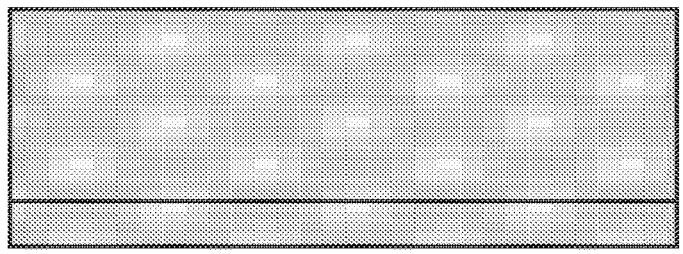
SOFA

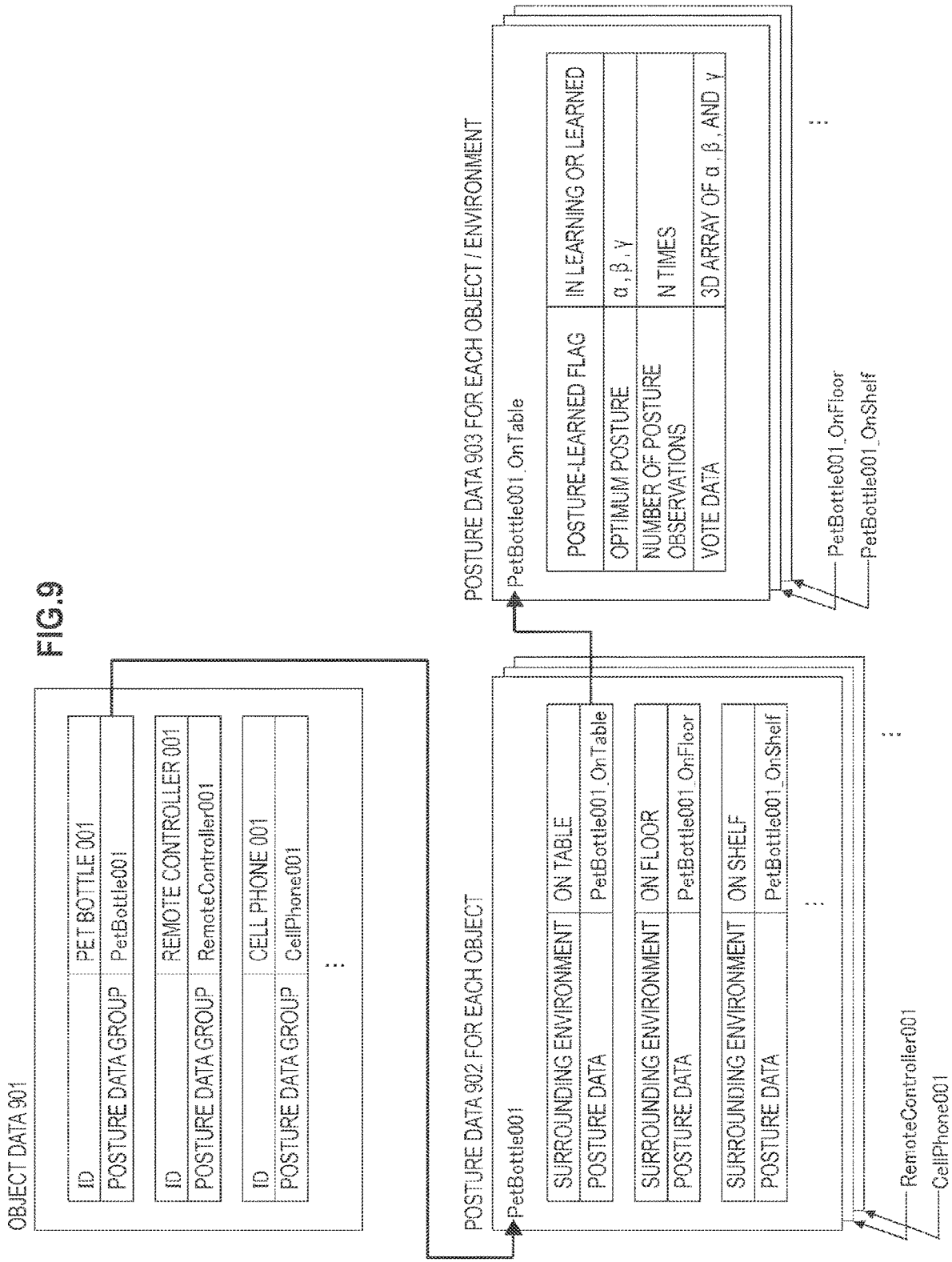

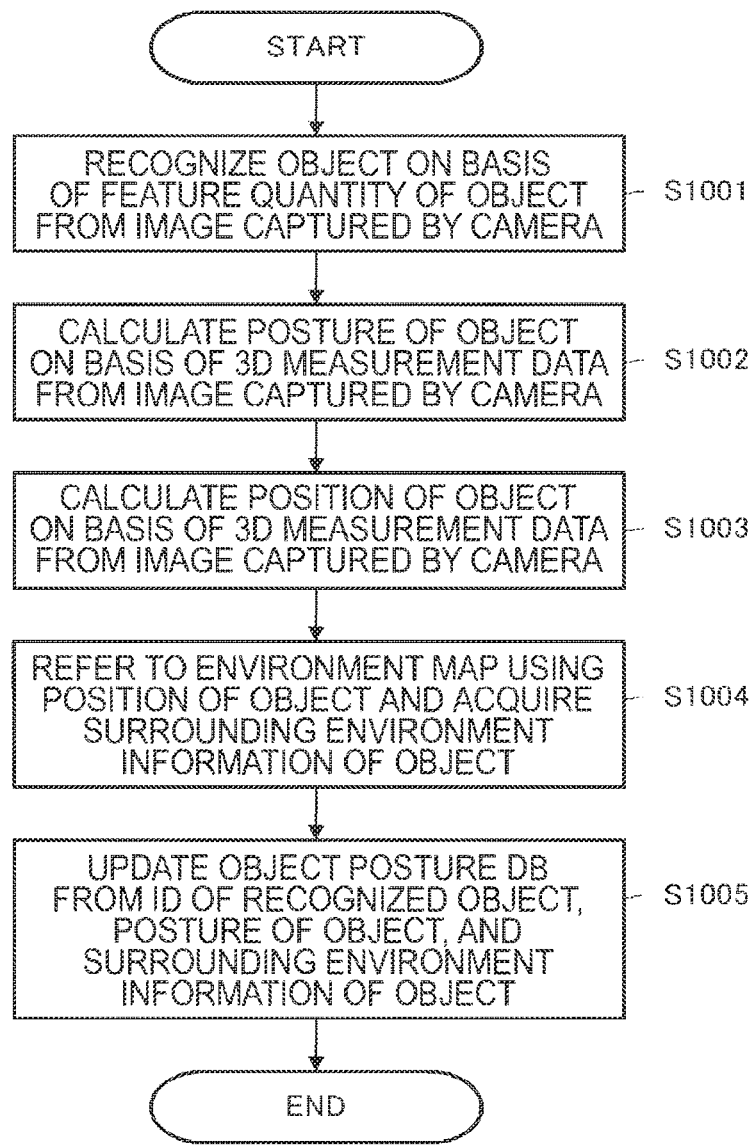

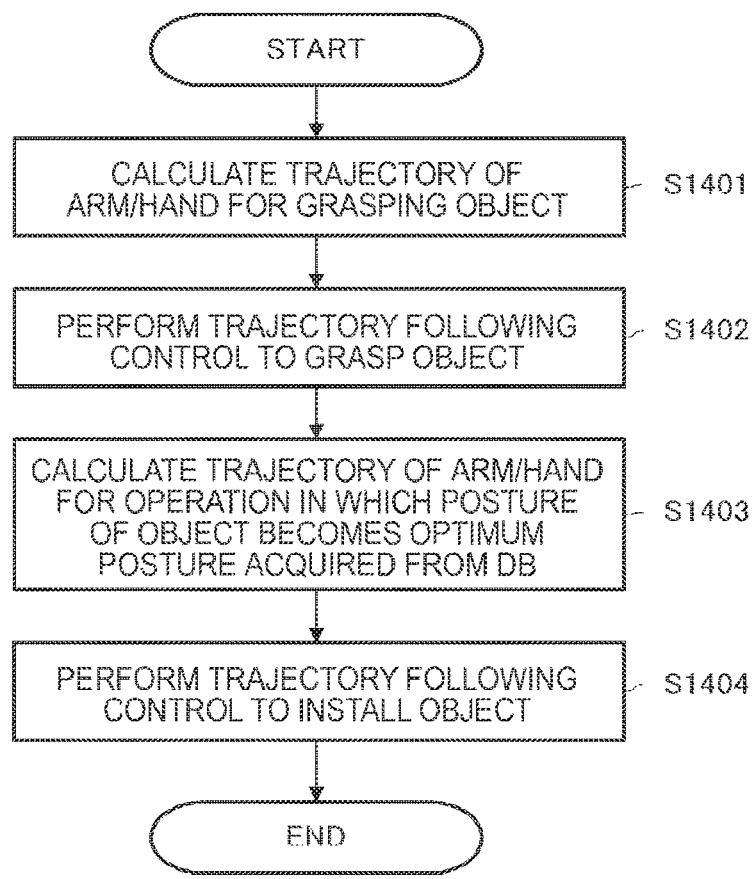

ROBOT DEVICE, METHOD OF CONTROLLING THE SAME, COMPUTER PROGRAM, AND ROBOT SYSTEM

CROSS-REFERENCE TO RELATED APPLICATIONS

This application is a continuation of U.S. application Ser. No. 15/868,519 filed Jan. 11, 2018, which is a continuation of U.S. application Ser. No. 15/258,436 filed Sep. 7, 2016 (now U.S. Pat. No. 9,908,241), which is a continuation of U.S. application Ser. No. 14/242,319 filed Apr. 1, 2014 (now U.S. Pat. No. 9,463,575), which is a continuation of Ser. No. 13/545,628 filed Jul. 10, 2012 (now U.S. Pat. No. 8,751,048), and claims priority to Japanese Patent Application No. 2011-161550 filed in the Japan Patent Office on Jul. 25, 2011. The entire contents of each of which are incorporated herein by reference.

BACKGROUND

The present technology disclosed in this specification relates to a robot device, which works to autonomously arrange a comfortable environment for a user, a method of controlling the same, a computer program, and a robot system, and more particularly, to a robot device that autonomously arranges placing positions and postures of objects to be frequently used so that a user can use the objects without difficulty, a method of controlling the same, a computer program, and a robot system.

Recently, robot devices for performing various tasks have been implemented. However, it is difficult for many robot devices to operate an object serving as an operation target in an optimum posture according to content of its operation or a surrounding environment.

Objects to be frequently used are normally placed in personally determined positions so that persons with disabilities, persons with physical disabilities, or disabled elders can use the objects without difficulty. Because placing positions and postures of these objects are very important for these users, robot devices capable of autonomously arranging comfortable environments for the users are desired.

In addition, when an object held by a robot is handed over to a user, the robot capable of handing over the object to the user in a posture in which the user can easily hold or use the object is desired.

For example, a cleanup robot for keeping daily goods and putting the daily goods into an empty space according to an instruction from a user or autonomously has been proposed (for example, see Japanese Patent Application Laid-Open No. 2007-152443). However, the cleanup robot does not consider an optimum position or posture of the object when putting the object into the empty space.

In addition, an information processing apparatus for generating an environment map on the basis of an image captured by a camera has been proposed (for example, see Japanese Patent Application Laid-Open No. 2008-304268). This information processing apparatus uses an ontology map to limit a search region of a target object to be recognized (for example, a user's face is likely to be above a sofa or in front of a television (TV)). This information processing apparatus can be applied to an agent (movable body) such as a robot provided with a camera. However, a posture of the target object is not considered.

In addition, a goods management system, which has a shape database of a target object, determines a posture at the time of the installation or the like after grasping/transporting the target object on the basis of information of the database, and enables a robot to move or transport the target object, has been proposed (for example, Japanese Patent No. 373854). However, the goods management system only grasps, transports, and installs the object. A process of autonomously arranging a comfortable environment for a user and exchanging the object with the user is not considered. In addition, a correct posture of the object in a complex environment is not considered.

SUMMARY

It is desirable to provide an excellent robot device, a method of controlling the same, a computer program, and a robot system that can enable placing positions and postures of objects that are frequently used to be autonomously arranged so that a user can use the objects without difficulty.

Also, it is desirable to provide an excellent robot device, a method of controlling the same, a computer program, and a robot system that can enable an object held by a robot to be easily held by a user or handed over to the user in a posture in which the user can easily use the object.

According to a first embodiment of the present technology, there is provided a robot device including:

an environment map including surrounding environment information;

an image input unit for inputting an image of surroundings;

a target object detection unit for detecting an object from the input image of the image input unit;

an object position detection unit for detecting a position of the object detected by the target object detection unit;

an environment information acquisition unit for acquiring surrounding environment information of the position of the object detected by the object position detection unit from the environment map;

an optimum posture acquisition unit for acquiring an optimum posture corresponding to the surrounding environment information acquired by the environment information acquisition unit for the object detected by the target object detection unit;

an object posture database for retaining an optimum posture of each object for each environment;

an object posture detection unit for detecting a current posture of the object from the input image of the image input unit;

an object posture comparison unit for comparing the current posture of the object detected by the object posture detection unit to the optimum posture of the object retained in the object posture database; and an object posture correction unit for correcting the posture of the object when the object posture comparison unit determines that there is a predetermined difference or more between the current posture of the object and the optimum posture.

According to a second embodiment of the present technology based on the robot device of the first embodiment, the robot device further includes: a task execution unit for executing a task based on an instruction of a user. When the task execution unit is not executing the task, the detection of the current posture of the object by the object posture detection unit, the comparison with the optimum posture by the object posture comparison unit, and the correction of the posture of the object by the object posture correction unit are configured to be autonomously performed.

According to a third embodiment of the present technology based on the robot device of the first embodiment, the robot device further includes: a moving unit for moving a position of the robot device. The object posture detection unit is configured to detect the current posture of the object while the moving unit moves a current position of the robot device.

According to a fourth embodiment of the present technology based on the robot device of the first embodiment, the optimum posture acquisition unit is configured to acquire an optimum posture of each object by learning and retain the acquired optimum posture in the object posture database.

According to a fifth embodiment of the present technology based on the robot device of the fourth embodiment, the object posture database is configured to further retain the optimum posture of each object taught from a user.

According to a sixth embodiment of the present technology based on the robot device of the first embodiment, the robot device further includes: an environment map update unit for updating the environment map on a basis of the input image of the image input unit.

According to a seventh embodiment of the present technology based on the robot device of the first embodiment, the optimum posture acquisition unit is configured to acquire an optimum posture for placing the object when arranging a comfortable environment for a user and an optimum posture of the object when handing the object over to the user.

According to an eighth embodiment of the present technology based on the robot device of the first embodiment, the environment information acquisition unit is configured to acquire the surrounding environment information of the position of the object detected by the object position detection unit from the environment map including the surrounding environment information.

According to a ninth embodiment of the present technology based on the robot device of the first embodiment, the object posture comparison unit is configured to compare the current posture of the object detected by the object posture detection unit to the optimum posture of the object retained in the object posture database retaining the optimum posture of each object for each environment.

According to a tenth embodiment of the present technology, there is provided a method of controlling a robot device, including:
  inputting an image of surroundings;
  detecting an object from the image input in the step of inputting;
  detecting a position of the object detected in the step of detecting an object;
  acquiring surrounding environment information of the position of the object detected in the step of detecting from an environment map including the surrounding environment information;
  acquiring an optimum posture corresponding to the surrounding environment information acquired in the step of acquiring surrounding environment information for the object detected in the step of detecting an object;
  retaining an optimum posture of each object for each environment in an object posture database;
  detecting a current posture of the object from the image input in the step of inputting;
  comparing the current posture of the object detected in the step of detecting a current posture to the optimum posture of the object retained in the object posture database; and
  correcting the posture of the object when it is determined in the step of comparing that there is a predetermined difference or more between the current posture of the object and the optimum posture.

According to an eleventh embodiment of the present technology, there is provided a computer program, written in a computer-readable format, for controlling a robot device and causing a computer to function as:
  an environment map including surrounding environment information;
  an image input unit for inputting an image of surroundings;
  a target object detection unit for detecting an object from the input image of the image input unit;
  an object position detection unit for detecting a position of the object detected by the target object detection unit;
  an environment information acquisition unit for acquiring surrounding environment information of the position of the object detected by the object position detection unit from the environment map;
  an optimum posture acquisition unit for acquiring an optimum posture corresponding to the surrounding environment information acquired by the environment information acquisition unit for the object detected by the target object detection unit;
  an object posture database for retaining an optimum posture of each object for each environment;
  an object posture detection unit for detecting a current posture of the object from the input image of the image input unit;
  an object posture comparison unit for comparing the current posture of the object detected by the object posture detection unit to the optimum posture of the object retained in the object posture database; and
  an object posture correction unit for correcting the posture of the object when the object posture comparison unit determines that there is a predetermined difference or more between the current posture of the object and the optimum posture.

The computer program according to the eleventh embodiment of the present technology is defined as a computer program, written in a computer-readable format, for implementing a predetermined process on a computer. In other words, it is possible to exhibit a cooperative function on the computer and obtain the same functional effect as in the robot device according to the first embodiment of the present technology by installing the computer program according to the eleventh embodiment in the computer.

According to a twelfth embodiment of the present technology, there is provided a robot system including:
  an environment map constructed on an external device and including surrounding environment information;
  an object posture database, constructed on an external device, for retaining an optimum posture of each object for each environment; and
  a robot device including an image input unit for inputting an image of surroundings, a target object detection unit for detecting an object from the input image of the image input unit, an object position detection unit for detecting a position of the object detected by the target object detection unit, an environment information acquisition unit for acquiring surrounding environment information of the position of the object detected by the object position detection unit from the environment map, an optimum posture acquisition unit for acquiring an optimum posture corresponding to the surrounding environment information acquired by the environment information acquisition unit for the object detected by the target object detection unit, an object posture detection unit for detecting a current posture of the object from the input image of the image input unit, an object posture comparison unit for comparing the current posture of the object detected by the object posture detection unit to the optimum posture of the object retained in the object posture database, and an object posture correction unit for correcting the posture of the object when the object posture comparison unit determines that there is a predetermined difference or more between the current posture of the object and the optimum posture.

The "system" used herein refers to an assembly obtained by logically assembling a plurality of devices (or functional modules realizing specific functions), regardless of whether or not devices or functional modules are in a single housing.

According to the embodiments of the present disclosure described above, it is possible to provide an excellent robot device, a method of controlling the same, a computer program, and a robot system that can enable placing positions and postures of objects that are frequently used to be autonomously arranged so that a user can use the objects without difficulty.

In addition, according to the embodiments of the present technology disclosed in this specification, it is possible to provide an excellent robot device, a method of controlling the same, a computer program, and a robot system that can enable an object held by a robot to be easily held by a user or handed over to the user in a posture in which the user can easily use the object.

Other objects, features and advantages of the present technology disclosed in this specification will become more apparent from the following further detailed description of embodiments of the present technology taken in conjunction with the accompanying drawings.

BRIEF DESCRIPTION OF THE DRAWINGS

FIG. 1 is a diagram illustrating the external appearance of a robot device 100 to which the present technology disclosed in this specification is applicable;

FIG. 6 is a diagram illustrating a state in which a comfortable environment for a user is arranged as an operation corresponding to an environment of the robot device 100;

FIG. 9 is a diagram illustrating a configuration example of an object posture database 409;

FIG. 10 is a flowchart illustrating a processing procedure of generating and updating the object posture database 409 online;

FIG. 14 is a flowchart illustrating a processing procedure executed by the robot device 100 under an "object posture correction" mode.

DETAILED DESCRIPTION OF THE EMBODIMENT(S)

Figure 2:
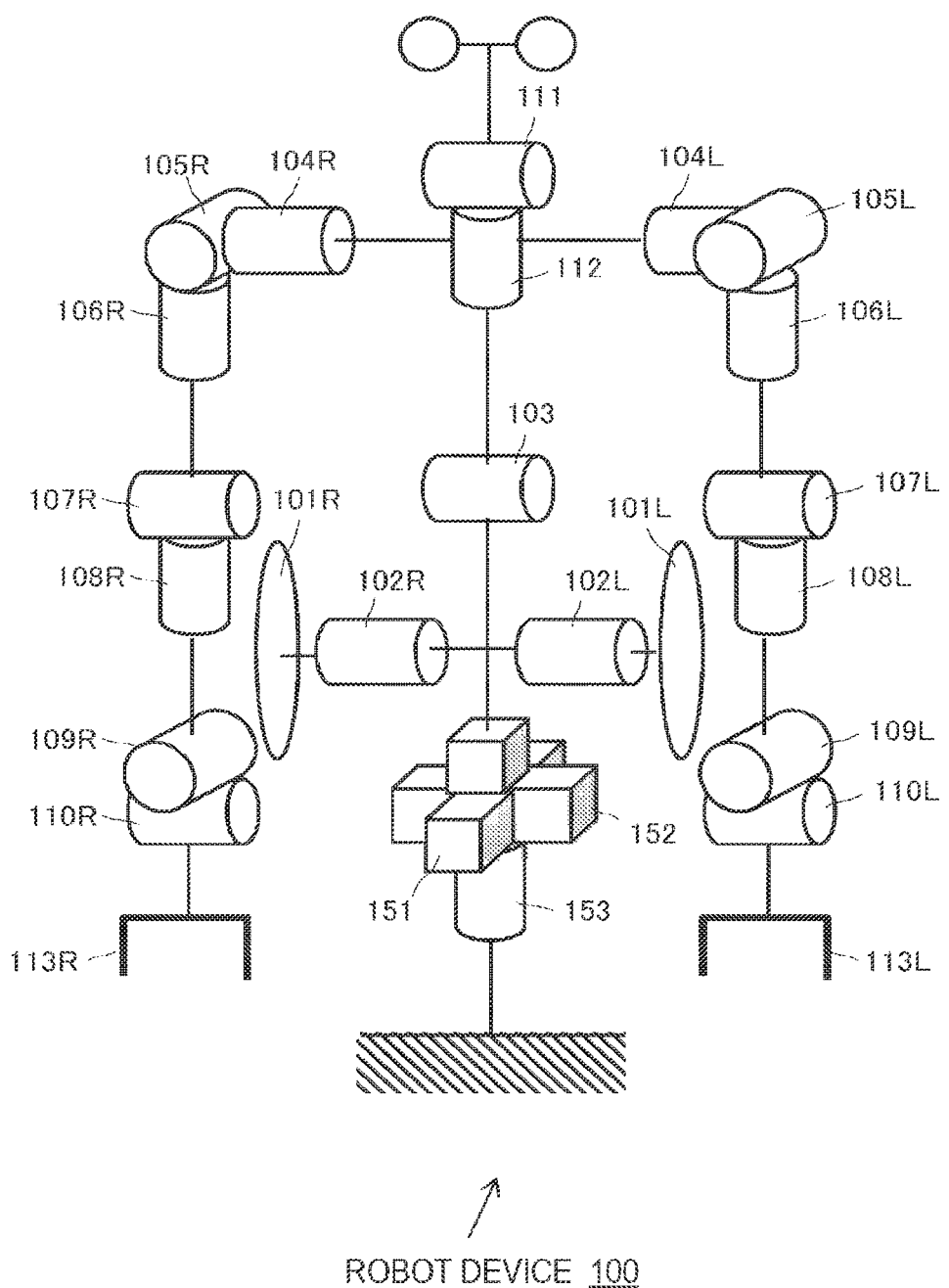
FIG. 2 is a diagram schematically illustrating a joint degree-of-freedom configuration of the robot device 100 to which the present technology disclosed in this specification is applicable.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In FIG. 1, the external appearance of a robot device 100 to which the present technology disclosed in this specification is applicable is illustrated. The robot device 100 is a link tectonic belt in which a plurality of links are connected by joints, each of which is operated by an actuator. In FIG. 2, a joint degree-of-freedom configuration of the robot device 100 is schematically illustrated. Although the illustrated robot device 100 mainly installed in a home environment performs household chores or care, the robot device 100 is available for various purposes such as industrial uses.

The illustrated robot device 100 is provided with two drive wheels 101R and 101L facing a base unit as moving means. The drive wheels 101R and 101L are driven by drive-wheel actuators 102R and 102L, each of which rotates about a pitch axis. In FIG. 2, reference numerals 151, 152, and 153 denote non-existent underactuated joints. The joints 151, 152, and 153 correspond to a degree of translational freedom of an X direction (front-back direction) to a floor surface of the robot device 100, a degree of translational freedom of a Y direction (left-right direction), and a degree of rotational freedom about a yaw axis, respectively. The joints 151, 152, and 153 are expressions of moving of the robot device 100 around the virtual world.

The moving means is connected to an upper body via a hip joint. The hip joint is driven by a hip joint pitch-axis actuator 103 that rotates about the pitch axis. The upper body is constituted by two limbs including left and right arm portions and a head portion connected via a neck joint. The left and right arm portions each have a total of seven degrees of freedom including three degrees of freedom of a shoulder joint, two degrees of freedom of an elbow joint, and two degrees of freedom of a wrist joint. The three degrees of freedom of the shoulder joint are driven by a shoulder-joint pitch-axis actuator 104R/L, a shoulder-joint roll-axis actuator 105R/L, and a shoulder-joint yaw-axis actuator 106R/L. The two degrees of freedom of the elbow joint are driven by an elbow-joint pitch-axis actuator 107R/L and an elbow-joint yaw-axis actuator 108R/L. The two degrees of freedom of the wrist joint are driven by a wrist-joint roll-axis actuator 109R/L and a wrist-joint pitch-axis actuator 110R/L. In addition, two degrees of freedom of the neck joint are driven by a neck-joint pitch-axis actuator 111 and a neck-joint yaw-axis actuator 112. In addition, one degree of freedom of a hand joint is driven by a hand-joint roll-axis actuator 113R/L.

Although the illustrated robot device 100 has moving means of two facing wheels, the present technology disclosed in this specification is not limited to the moving means of the two facing wheels. For example, the present technology disclosed in this specification can also be applied to the robot device 100 having leg type moving means.

Each axis actuator is attached to a speed reducer for obtaining sufficient generative force as well as an encoder for measuring a joint angle, a motor for generating torque, and a current control motor driver for driving the motor. In addition, a microcomputer, which controls driving of the actuator, is attached to the actuator (although not illustrated in FIG. 2).

A dynamic arithmetic operation of the robot device 100 is executed on a host computer, and generates a control target value of a torque or joint angle of each joint actuator. The control target value is transmitted to the control microcomputer attached to the actuator, and used for control of the actuator to be executed on the control microcomputer. In addition, each joint actuator is controlled by a force control scheme or a position control scheme.

Figure 3:
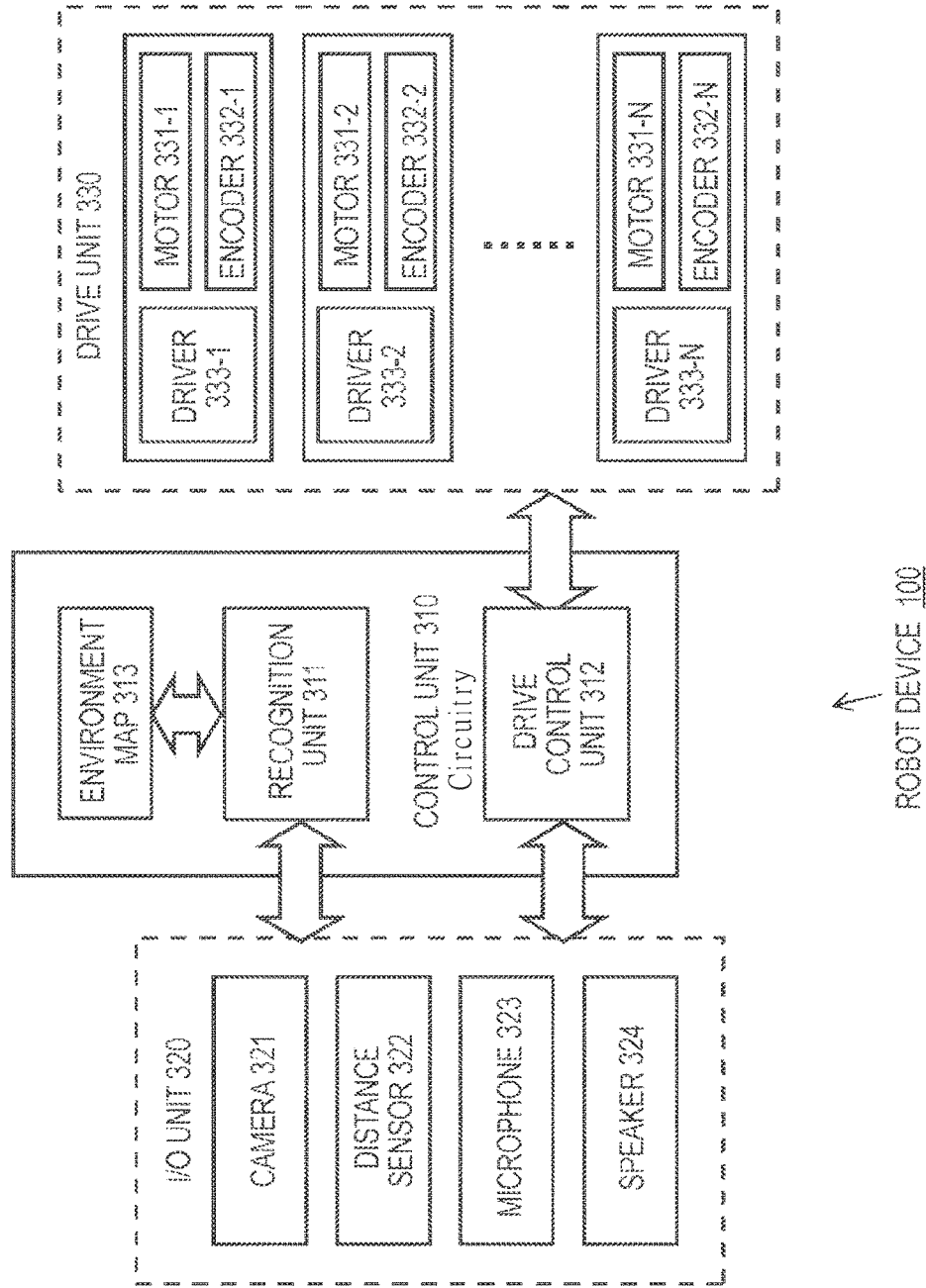
FIG. 3 is a diagram schematically illustrating a functional configuration for controlling the robot device 100 illustrated in FIG. 1.

FIG. 3 schematically illustrates a functional configuration which controls the robot device 100 shown in FIG. 1. The robot device 100 includes a control unit 310, which performs integrated control of the entire operation or processes data, an input/output (I/O) unit 320, and a drive unit 330. Hereinafter, these units will be described.

The I/O unit 320 includes a camera 321 corresponding to the eye of the robot device 100, a distance sensor 322, which detects a distance to a human or obstacle, a microphone 323 corresponding to the ear of the robot device 100, and the like as input units. In addition, the I/O unit 320 includes a speaker 324 corresponding to the mouth of the robot device 100 and the like as output units. Here, the distance sensor 322 is constituted by a space sensor, for example, such as a laser range finder or the like. The robot device 100 can receive a task instruction by an audio input of a user, for example, from the microphone 323. However, the robot device 100 may have another task-instruction input means (not illustrated) via a wired link, a wireless link, recording media, or the like.

The drive unit 330 is a functional module for implementing a degree of freedom in each joint of the robot device 100, and is constituted by a plurality of drive units provided for each roll, pitch, or yaw axis in each joint. Each drive unit is constituted by a combination of a motor 331, which performs a rotation operation about a predetermined axis, an encoder 332, which detects a rotation position of the motor 331, and a driver 333, which adaptively controls a rotation position or a rotation speed of the motor 331 on the basis of the output of the encoder 332.

The control unit 310 includes a recognition unit 311, a drive control unit 312, and an environment map 313.

The recognition unit 311 recognizes a surrounding environment on the basis of information obtained from the input unit such as the camera 321 or the distance sensor 322 within the I/O unit 320. For example, the recognition unit 311 pre-constructs or updates the environment map 313 on the basis of the input information.

The drive control unit 312 controls the output unit of the I/O unit 320 or the drive of the drive unit 330. For example, the drive control unit 312 controls the drive unit 330 to enable the robot device 100 to implement tasks. Here, the tasks to be implemented by the robot device 100 include household chores or care corresponding to an instruction, an operation corresponding to an environment, and the like. In addition, the operation corresponding to the environment can be an operation of enabling placing positions and postures of objects that are frequently used to be autonomously arranged so that a user can use the objects without difficulty, or an operation of enabling an object held by a robot to be easily held by the user or handed over to the user in a posture in which the user can easily use the object.

Figure 4:
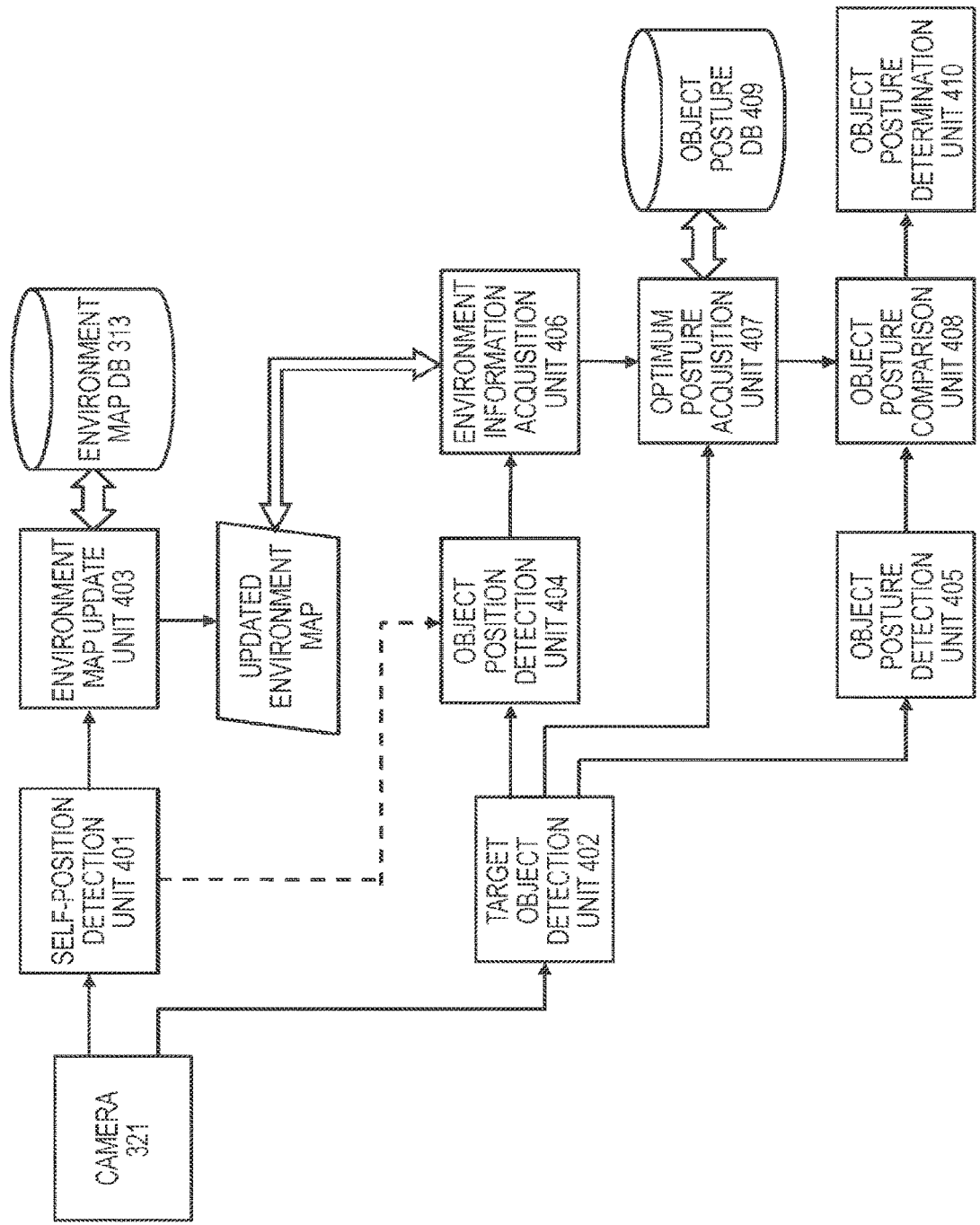
FIG. 4 is a diagram schematically illustrating a functional configuration for enabling the robot device 100 to implement an operation corresponding to an environment.

In FIG. 4, a functional configuration for enabling the robot device 100 to implement an operation corresponding to an environment is schematically illustrated.

The environment map 313 is a database including shape, position, and posture data of objects such as a table, a sofa, a bookshelf, and a TV in a work area in which the robot device 100 operates such as a room in which the user is located.

As a difference between an object to be managed by the database in the environment map 313 and an object of which a position and a posture are autonomously arranged by the robot device 100, the former can be a large object incapable of being operated or moved by the arm of the robot device 100 or the like, and the latter can be a small object capable of being grasped and moved by the robot device 100. While the objects such as the table, the sofa, the bookshelf, and the TV are managed in the environment map, a PET bottle, a remote controller, and the like are target objects of which positions and postures are autonomously arranged by the robot device 100 or which are handed over to the user.

A self-position detection unit 401 detects or estimates a self-position of the robot device 100 based on a measurement result of the camera 321 or the distance sensor 322. In addition, an environment map update unit 403 constructs and updates the environment map 313.

A target object detection unit 402 detects a target object from an image captured by the camera 321. The target object detection unit 402 can detect the target object, for example, by image processing of a feature quantity such as a contour, an edge, a corner, a luminance change, or a color, a three-dimensional (3D) shape of the object, or an artificial geometric pattern such as a barcode attached to the object. Alternatively, the target object may be detected by reading information such as an identifier (ID) from a wireless tag attached to the target object.

The robot device 100 autonomously learns an optimum posture of the detected target object. During the learning, an object position detection unit 404 calculates a 3D position of the target object from the self-position estimated by the self-position detection unit 401 and the position of the target object detected by the target object detection unit 402 from the image captured by the camera 321.

In addition, an environment information acquisition unit 406 acquires surrounding environment information of the position of the detected object from the environment map updated by the environment map update unit 403. The surrounding environment information of the target object can be acquired from the 3D position and the environment map of the target object. For example, the information may indicate a state in which "the PET bottle should be on the table" and "the remote controller should currently be on the sofa and the TV should be opposite to the remote controller."

When acquiring a correct (or optimum) posture, corresponding to the surrounding environment information, for placing a target object at the time of arranging a comfortable environment for the user or a correct (or optimum) posture, corresponding to the surrounding environment information, of the target object at the time of handing the target object over to the user as dictionary data, an optimum posture acquisition unit 407 registers the acquired posture in an object posture database 409. For example, it is possible to acquire the posture of the target object a plurality of times and determine a correct posture on the basis of vote results of the postures (as will be described later).

Table 1 shows an example of dictionary data of the correct posture for placing the target object at the time of arranging the comfortable environment for the user. In addition, Table 2 shows an example of dictionary data of the correct posture in which the target object is handed over to the user.

TABLE 1

| Target object | Environment information | Correct posture |
| --- | --- | --- |
| PET bottle | On table or floor | State in which cap is put on top |
| Mug | On table or floor | Stand-up state |
| Remote controller | On table, sofa, or floor | Buttons facing upward |
| | Near TV | Transmitter toward TV |
| Slippers | On floor | Tops of slippers facing upward |
| | Near bed | Ankle side closer than bed |

TABLE 2

| Target object | Environment information | Correct posture |
| --- | --- | --- |
| PET bottle | | Cap put on top |
| Mug | | Handle portion toward user |
| Scissors | | Handle portion toward user |
| Cane | | Handle portion toward user |
| Pen | | Side opposite to pen tip toward user |

However, in Table 1, designations of surrounding environments can be combined. For example, the slippers are on the floor and near the bed.

The robot device 100 learns the optimum posture of each target object and registers the optimum posture in the object posture database 409 as the dictionary data. Alternatively, the user may cause the dictionary data of the robot device 100 to be remembered or teach the robot device 100 via a user interface (UI).

When normally walking around, the robot device 100 observes and learns a usual posture in which an object is placed. For example, the fact that the bottle cap is normally put on the top is learned by observing the PET bottle. As shown in the above-described Table 1, a usual posture may be learned for each environment in which the target object is placed. For example, "the PET bottle on the table seems to normally stand upright" and "the PET bottle on the floor seems to normally lie down (because the bottle is empty)."

In addition, the robot device 100 arranges a comfortable environment for the user on the basis of the learned result. For example, even when the user places an object in an unusual posture, the robot device 100 appropriately corrects its posture.

The object posture detection unit 405 detects a current 3D posture of a target object detected by the target object detection unit 402 from an image captured by the camera 321.

The optimum posture acquisition unit 407 estimates a correct posture of the target object by retrieving the object posture database 409 on the basis of the target object detected by the target object detection unit 402 from the image captured by the camera 321 and a latest environment map acquired by the environment information acquisition unit 406. In addition, the optimum posture acquisition unit 407 checks the object posture database 409 using information (a feature quantity, a wireless tag, or the like) used when the target object is detected from the environment, and obtains an optimum posture of the target object.

An object posture comparison unit 408 compares the 3D posture detected by the object posture detection unit 405 to the optimum posture estimated on the basis of the dictionary data registered in the object posture database 409. If there is a difference between the two postures, the object posture determination unit 410 determines a control amount for operating or correcting a position/posture of the target object so that the target object is in a correct posture.

As described above, the robot device 100 operates or corrects the target object to the correct posture on the basis of the dictionary data registered in the object posture database 409. Before the position posture of the target object is operated or corrected, a query may be sent to the user. In addition, when the position posture of the target object operated or corrected by the robot device 100 is wrong, the user may perform teaching. The user can teach the robot the correct posture of the object by showing the correct posture. For example, the user indicates "Place like this" by audio while showing the PET bottle in the standing-up posture. Alternatively, the user can teach the correct posture of the object by audio. For example, an indication indicating that "the PET bottle stands upright" is made.

In the robot device 100 according to this embodiment, the optimum posture acquisition unit 407 can generate the object posture database 409 online. In the construction of the object posture database 409, a process of acquiring the position and posture of the target object detected by the target object detection unit 402 is indispensable.

A shape of the object can be acquired as prior knowledge such as computer aided design (CAD) data or by polygonization after 3D measurement is performed by a stereo camera. When the shape of the object is acquired as the dictionary data, an object-specific coordinate system is set for the polygonized shape. For example, in terms of a cylindrical object (or approximately cylindrical object) as illustrated in FIG. 8A, a center is the origin, a main axis is set to an axis z' and axes x' and y' are appropriately set to be symmetrical with a rotation of the axis z'.

Figure 8A:
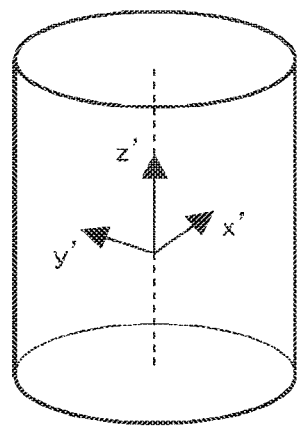
FIG. 8A is a diagram illustrating a state in which a unique coordinate system is set in relation to a cylindrical object (or an approximately cylindrical object)
Figure 8B:
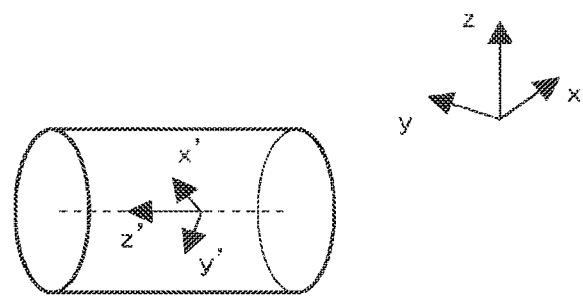
FIG. 8B is a diagram illustrating a state in which object coordinates x', y' and z' are three-dimensionally rotated with respect to world coordinates x, y, and z.

In addition, when the cylindrical object (or approximately cylindrical object) as illustrated in FIG. 8A is placed in the real world in terms of the posture of the object, the posture of the object can be implemented according to a 3D rotation of object coordinates x', y', and z' with respect to real-world coordinates x, y, and z (see FIG. 8B). Arbitrary 3D rotation can be implemented by three parameters such as Euler angles or roll-pitch-yaw angles (each rotation angle when a rotation is continuously performed about a certain axis among the three axes). In the following description, the three parameters of the posture of the object are referred to as $\alpha$, $\beta$, and $\gamma$.

Except for the moment when a task is performed according to an instruction from the user, the robot device 100 according to this embodiment acquires a posture of each target object by autonomously observing a surrounding environment on the basis of an image captured by the camera 321. The posture of the target object is continuously acquired. For each target object, a usual posture is calculated by a technique such as voting.

Specifically, a 3D array representing a parameter space ($\alpha$, $\beta$, $\gamma$) is provided as a voting space, and also parameters are appropriately discretized and handled. Because these parameters are angles, that is, continuous amounts, the parameter is represented by a median value of its step width within its step width, for example, as 0 to 5 degrees, 5 to 10 degrees, 10 to 15 degrees, . . . , every 5 degrees. Because 360÷5=72, if 360 degrees are divided by 5 degrees, the above-described parameter space (α, β, γ) becomes a 3D array of 72×72×72. Every time the posture (α, β, γ) of the object is observed, a value of a corresponding element of the array is incremented by 1. If the total number of observations of the object (the total number of votes) reaches the prescribed number of times arbitrarily set, the optimum posture acquisition unit 407 finds parameters α, β, and γ in which the number of acquired votes becomes a maximum value, and sets the found parameters α, β, and γ to an optimum posture of the object.

Although a configuration example in which voting is directly conducted for the number of observations by incrementing an element corresponding to the 3D array by 1 for one observation has been described above, a configuration may be made to conduct voting by weighting. For example, a configuration example in which voting is conducted after weighting to one observation by estimating/considering a period of time in which the object is in the posture may be included.

In addition, when a surrounding environment is different even for the same object, learning as described above is performed for each environment. For example, when the same PET bottle is on the table or floor as shown in the above-described Table 1, an optimum posture is obtained for each placing position. Surrounding environment information of the object (indicating that the object is placed on the table or the like) is obtained on the basis of a current position of the object estimated by the object position detection unit 404 and the (updated) environment map.

As described above, the optimum posture acquisition unit 407 registers a correct posture in which the target object is placed when the comfortable environment for the user is autonomously arranged or a correct posture of the target object when the target object is handed over to the user in the object posture database 409. A configuration example of the object posture database 409 is illustrated in FIG. 9. In the illustrated example, the object posture database 409 is constituted by three types of databases including a database 901 storing object data, a database 902 storing posture data for each object, and a database 903 storing posture data for each object/environment.

The database 901 storing the object data has IDs for identifying various objects and a pointer for an object-related posture database. The database 902 storing the posture data for each object has information regarding a surrounding environment in which the object is placed and a pointer for the posture database in the object and the environment. The database 902 storing the posture data for each object may be configured to have object-specific information such as a shape, mass, and material as well as a posture, although this is not illustrated because it is not directly related to the technology disclosed in this specification, for generating the database online. The database 903 storing the posture data for each object environment has a posture learned flag indicating whether or not an optimum posture can be calculated by sufficiently observing the object in the environment, and a posture (α, β, γ) if learning is completed. In addition, middle results in a learning process, that is, a 3D array of a parameter space (α, β, γ) storing each number of votes and the total number of observations of the object, are also included in the database 903, and a configuration is made so that data can be referred to during learning. However, a configuration may be made so that these middle results are not referred to by arranging the middle results outside the database 903.

Of course, the above-described three databases 901 to 903 may be manually created. For example, for an object of which a posture is known in advance, the "posture learned flag" of the database 903 for each object environment may be set to "learned" and its posture data may be set to the "optimum posture."

Next, a process of generating the object posture database 409 online will be described.

In FIG. 10, a processing procedure of generating and updating the object posture database 409 online is illustrated in the form of a flowchart. The optimum posture acquisition unit 407 is assumed to periodically iterate this process.

The target object detection unit 402 recognizes various surrounding objects on the basis of an image captured by the camera 321 (step S1001).

In addition, simultaneously, a shape and posture recognized by the object posture detection unit 405 are calculated by 3D measurement by the stereo camera (step S1002), and a position of the object recognized by the object position detection unit 404 is calculated (step S1003).

Then, the optimum posture acquisition unit 407 acquires surrounding environment information of the object (for example, on the table or the like) according to the calculated 3D position of the object and the environment map acquired by the environment information acquisition unit 406 (step S1004).

The optimum posture acquisition unit 407 generates and further updates the object posture database 409 based on an object identification ID, the posture of the object, and the environment information obtained as described above (step S1005).

Figure 11:
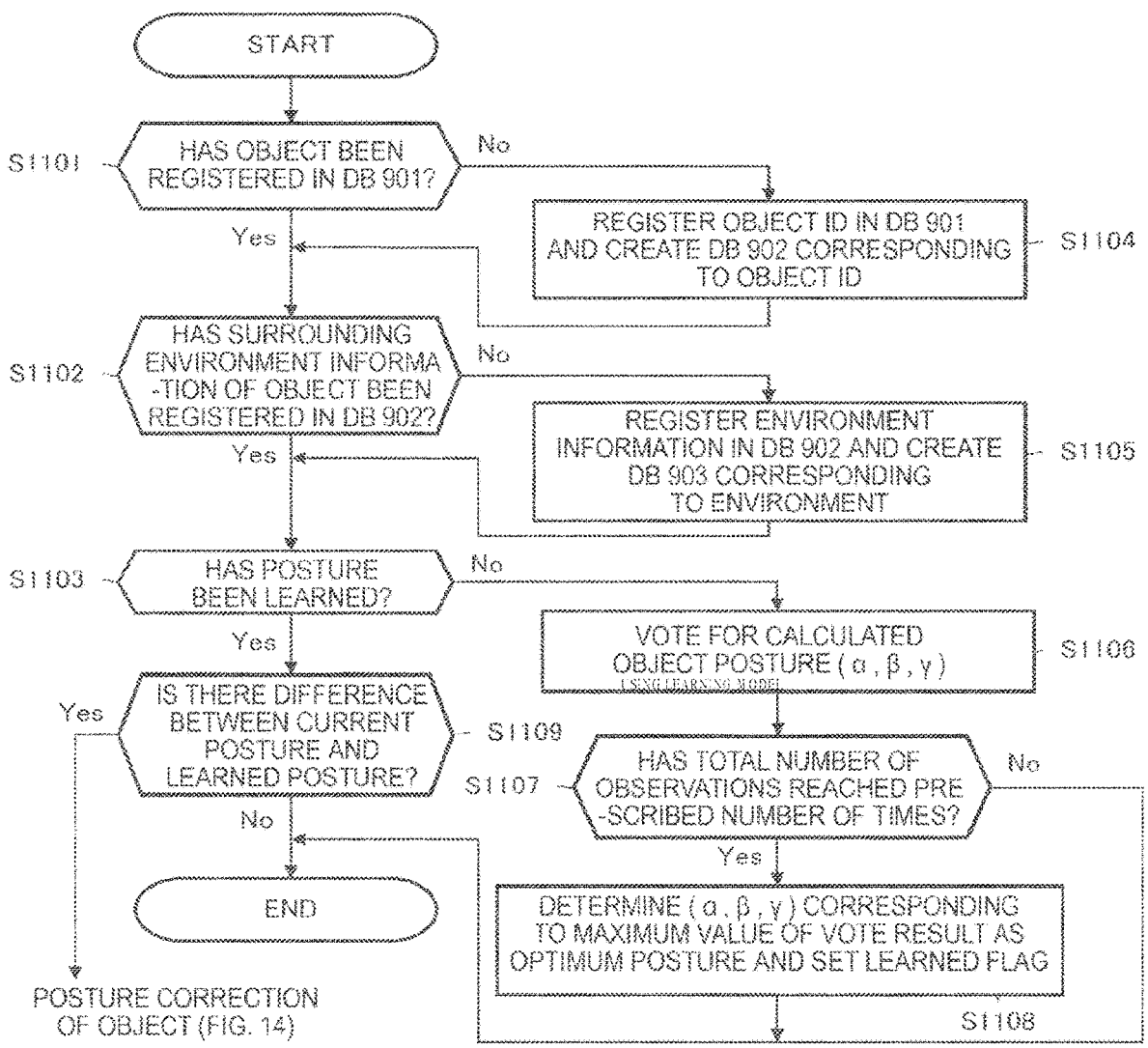
FIG. 11 is a flowchart illustrating a processing procedure of generating and updating the object posture database 409.

In FIG. 11, a processing procedure of generating and updating the object posture database 409, which is executed in step S1005 described above, is illustrated in the form of a flowchart.

The optimum posture acquisition unit 407 first checks whether or not the ID of the recognized object is already registered in the database 901 retaining the object data (step S1101).

Here, when the ID of the recognized object is not registered in the database 901 (No in step S1101), the optimum posture acquisition unit 407 registers the ID of the object in the database 901, and also creates posture data corresponding to the object ID in the database 902 (step S1104).

When the ID of the recognized object is already registered in the database 901 and after the posture data corresponding to the object ID is created in the database 902, the optimum posture acquisition unit 407 checks whether or not surrounding environment information of the object is already registered in the database 902 retaining posture data of each object (step S1102).

Here, when the surrounding environment information of the object is not registered in the database 902 (No in step S1102), the optimum posture acquisition unit 407 registers the surrounding environment information of the object in the posture database 902 for each object and registers posture data corresponding to its environment in the database 903 (step S1105).

When the surrounding environment information of the object is already registered in the database 902 and after the posture data corresponding to the environment is registered in the database 903, the optimum posture acquisition unit 407 checks whether or not an optimum posture of the object is learned (step S1103).

Here, when the optimum posture of the object is not learned, the optimum posture acquisition unit 407 votes for a posture (α, β, γ) of the object calculated by the object posture detection unit 405 (step S1106). When the total number of observations of the posture of the object does not reach the prescribed number of times (No in step S1107), this processing routine ends. In addition, when the total number of observations of the posture of the object reaches the prescribed number of times (Yes in step S1107), the optimum posture acquisition unit 407 determines a posture (α, β, γ) corresponding to a maximum value of a voting result in the database 903 as the optimum posture of the object, and sets the learned flag (step S1108), so that this processing routine ends.

When the optimum posture of the object is learned (Yes in step S1103), the object posture comparison unit 408 compares a current posture of the object to the learned optimum posture of the object and checks whether or not there is a difference between the two postures (step S1109).

If there is no difference between the current posture of the object and the learned optimum posture of the object (No in step S1109), this processing routine ends. On the other hand, when there is a difference between the current posture of the object and the learned optimum posture of the object (Yes in step S1109), the object posture determination unit 410 starts up a process of correcting the posture of the object. Details of the process of correcting the posture of the object will be described later.

Although an example in which the optimum posture is determined at a point in time when the total number of observations, that is, the total number of votes, is greater than or equal to the prescribed number of times in the processing procedure illustrated in FIG. 11 has been described, other implementation methods may be included. For example, as a result of voting as described above, it is possible to obtain a posture frequency distribution in the voting space (α, β, γ). According to the frequency distribution, when the current posture is "rare" (that is, a frequency is low as compared to other postures), the posture is changed to a posture of which a frequency is higher than those of others in vicinity of the posture in an object posture correction mode (as will be described).

It is possible to handle a plurality of "optimum postures" using a posture frequency distribution obtained by voting. For example, when a current posture of the object is obtained under a search mode (as will be described later), it is preferable that the posture be changed to a posture of which a frequency is higher than those of others in vicinity of the posture in the object posture correction mode.

In addition, it is possible to use the posture frequency distribution even when the number of votes is small. However, when the number of votes is small, it is rare to change an actual posture because a specific posture is not likely to be determined to be rare as compared to others. Still, it is not necessary to determine the "prescribed number of votes" (instead, it is necessary to define a frequency in which the posture is determined to be "rare"). This method has another advantage in that it is not necessary to appropriately define the "prescribed number of votes," which is a parameter for determining whether or not to make a posture change. Even in an initial state in which only the small number of votes is obtained, it is possible to determine how "rare" the posture is relatively as compared to a neighborhood of a certain posture pixel.

Further, a process of dynamically changing a box size of the voting space according to a vote distribution may be implemented. It is possible to use various methods of determining a histogram width in histogram density estimation to determine the box size. In addition, kernel density estimation can be performed directly using sample points instead of the histogram density estimation. If a probability density function p(posture|object, position) of a target object can be appropriately estimated using sample data, it is possible to appropriately correct a posture of the object by changing the posture of the object to a posture x_opt in which the probability density function p(posture|object, position) becomes maximum at the periphery when a probability density around certain posture data x is less than or equal to a threshold value.

Here, a process of generating and updating the object posture database 409 illustrated in FIG. 11 will be described as an example in which a PET bottle is detected as an object. However, hereinafter, a database name is distinguished by < >, a key within the database is distinguished by ' ', and a value corresponding to the key within the database is distinguished by " ".

First, the optimum posture acquisition unit 407 checks whether or not the PET bottle is registered in the database 901 retaining the object data (step S1101). If the PET bottle is not registered in the database 901 (No in step S1101), its ID "PET Bottle 001" is registered in the database 901, posture data <PetBottle001> of each object corresponding to the ID is created in the database 902, and simultaneously its pointer is registered in the database 901 (step S1105). At this time, a surrounding environment of the posture data <PetBottle001> of each object of the database 902 and the posture data are in an empty state.

Then, the optimum posture acquisition unit 407 checks whether or not environment information indicating "On Table" as the case in which the PET bottle is placed on the table is registered in the posture data <PetBottle001> of the database 902 (step S1102). In addition, if the environment information is not registered (No in step S1102), the optimum posture acquisition unit 407 registers "On Table" as 'Environment Information' in the database 902, creates posture data <PetBottle001_OnTable> of each object environment corresponding thereto in the database 903, and simultaneously registers its pointer in the database 902 (step S1105). At this time, 'Posture Learned Flag' of posture data <PetBottle001_OnTable> of each object environment registered in the database 903 is "In Learning."

Then, the optimum posture acquisition unit 407 checks whether or not learning is already completed in relation to the posture of the PET bottle on the table by referring to 'Posture Learned Flag' of <PetBottle001_OnTable> of the database 903 (step S1103). If the learning is not completed (No in step S1103), the optimum posture acquisition unit 407 votes for the posture of the object calculated by the object posture detection unit 405 in a 3D array of a parameter space (α, β, γ) (step S1106). If the total number of observations (the total number of votes) has reached the prescribed number of times in relation to the object (Yes in step S1107), the optimum posture acquisition unit 407 finds parameters α, β, and γ in which the acquired number of votes becomes maximum, sets the found parameters α, β, and γ to 'Optimum Posture' of the object, and sets 'Posture Learned Flag' to "Learned" (step S1108). In addition, if the total number of observations has not reached the prescribed number of times (No in step S1107), 'Number of Posture Observations' is incremented by 1 and the above-described process is continued until the total number of observations reaches the prescribed number of times.

Although the learning is stopped after the optimum posture of the object is obtained once the learning ends in the above-described example, the optimum posture acquisition unit 407 may be configured to update 'Optimum Posture' while continuing observation.

In addition, although the robot device 100 iteratively observes an object and generates posture data of each object environment without <PetBottle001_OnTable> in the database 903 in the above-described example, any data related to <PetBottle001_OnTable> may be manually created as prior information and the posture data may be updated by observation/learning.

Figure 12:
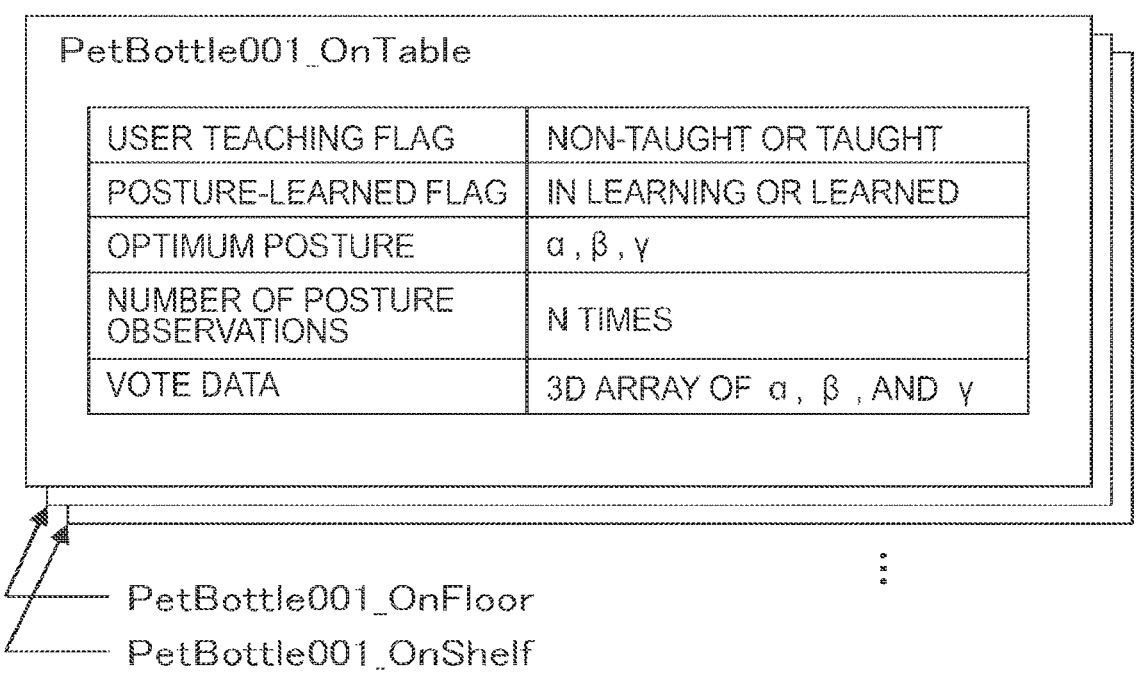
FIG. 12 is a diagram illustrating a modified example of a database 903 of posture data of each object/environment.

In FIG. 12, a modified example of the database 903 of posture data of each object environment illustrated in FIG. 9 is illustrated. As a difference from FIG. 9, a key referred to as 'User Teaching Flag' is added to posture data <PetBottle001_OnTable> of each object environment. 'User Teaching Flag' is information indicating whether or not the user has taught the posture when placing the PET bottle on the table. For example, when the user causes the robot device 100 to view the PET bottle on the table by placing the PET bottle on the table and makes an instruction indicating a desire that the PET bottle be placed in the posture as described above, the robot device 100 changes 'User Teaching Flag' from "Non-Taught" to "Taught" and changes 'Optimum Posture' to the posture of the object observed at the time. This can be easily implemented by adding a process in which a taught posture is preferentially used when there is teaching from the user and the posture is not learned if 'User Teaching Flag' is "Taught" to the process of step S1103 of FIG. 11. This is an effective technique when there is a desire for an object especially important for the user to be placed in a fixed posture or when the user corrects the posture due to wrong learning of the robot.

Figure 13:
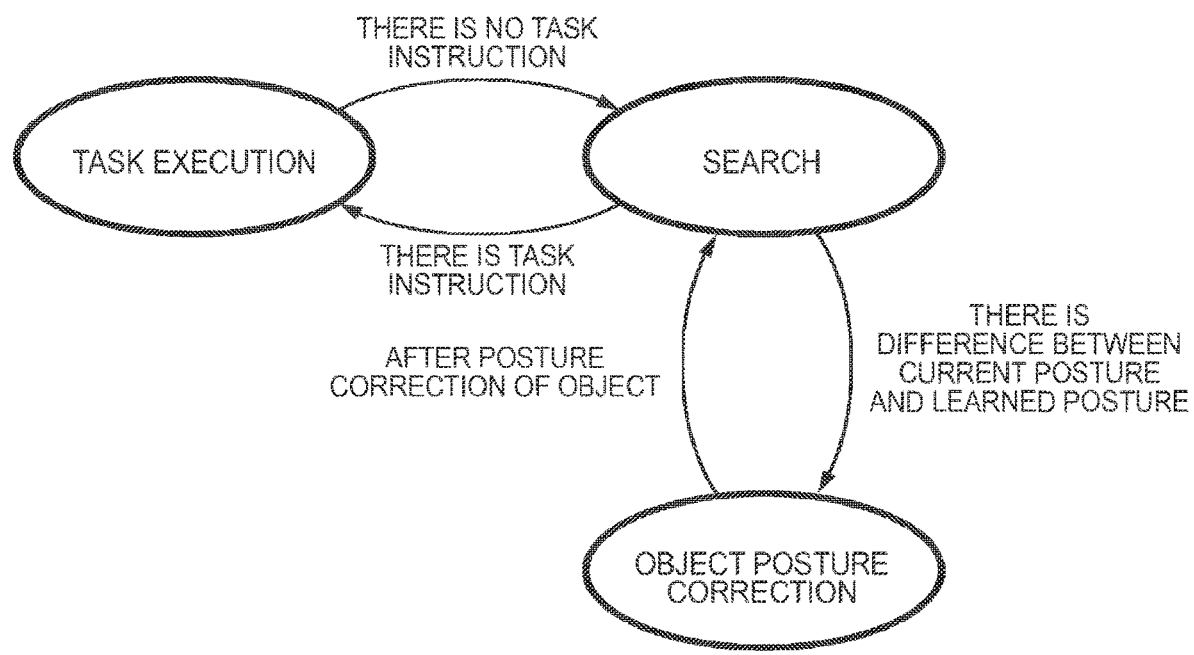
FIG. 13 is a state transition diagram illustrating an operation executed by the robot device 100.

In FIG. 13, the operation to be executed by the robot device 100 is illustrated in the form of a state transition diagram. In the illustrated example, the robot device 100 has three operation modes of "task execution," "search," and "object posture correction."

Under the "task execution" mode, the robot device 100 executes a task of an instruction from the user. In addition to an explicit instruction through an audio input or the like, an instruction of the task from the user includes a task to be periodically executed by a timer scheduled in advance (a cleaning task when a certain prescribed time is reached) and a task to be executed according to generation of a predetermined event (a high-priority task according to sudden interruption such as an operation of viewing and picking up a ball rolling down from the table).

When there is no instruction of execution of a task from the user, the robot device 100 moves to the "search" mode. In addition, if there is the instruction of execution of the task from the user under the "search" mode, the robot device 100 returns to the "task execution" mode by stopping the search.

Under the "search" mode, the robot device 100 performs a process of autonomously observing a room while moving around in the room and generating/updating the object posture database 409 according to processing procedures illustrated in FIGS. 10 and 11. In addition, if a currently observed posture of the object is found not to be a learned optimum posture of the object in the "search" mode, the process moves to the "object posture correction" mode.

Under the "search" mode, the robot device 100 updates the object posture database 409 and simultaneously compares the current posture of the object to the optimum posture registered in the object posture database 409 (step S1109 of FIG. 11). Specifically, the object posture detection unit 405 obtains the current posture ($\alpha'$, $\beta'$, $\gamma'$) of the object. When there is the current posture ($\alpha$, $\beta$, $\gamma$) of the object in the already learned object posture database 409, the object posture comparison unit 408 can determine that the current posture of the object is substantially consistent with the optimum posture if the following Expression (1) is satisfied. In the following Expression (1), $\Delta\alpha_{th}$, $\Delta\beta_{th}$, and $\Delta\gamma_{th}$ are preset threshold values.

$$|\alpha-\alpha'|<\Delta\alpha_{th}, |\beta-\beta'|<\Delta\beta_{th}, \text{ and } |\gamma-\gamma'|<\Delta\gamma_{th} \quad (1)$$

On the other hand, if Expression (1) is not satisfied, the process proceeds to the branch Yes of step S1109, so that the robot device 100 moves to the "object posture correction" mode.

In FIG. 14, a processing procedure to be executed by the robot device 100 under the "object posture correction" mode is illustrated in the form of a flowchart.

First, the object posture determination unit 410 calculates a trajectory of an arm/hand for grasping the object from a current posture ($\alpha'$, $\beta'$, $\gamma'$) of the object (step S1401).

Then, the object posture determination unit 410 grasps the object by controlling the arm/hand along the calculated trajectory through the drive control unit 312 (step S1402).

Then, the object posture determination unit 410 calculates the trajectory of the arm/hand for operating the object so that the grasped object becomes the optimum posture ($\alpha$, $\beta$, $\gamma$) acquired from the object posture database 409 (step S1403).

The object posture determination unit 410 places the object of which the posture becomes the optimum posture ($\alpha$, $\beta$, $\gamma$) by controlling the arm/hand along the calculated trajectory through the drive control unit 312 (step S1404).

A process in which the robot device 100 generates/updates the object posture database 409 by moving to the "search" mode when there is no instruction of execution of the task from the user has been described above. However, as a modified example, in a range in which the task in execution is not affected even when the task is in execution, line-of-sight control of the camera 321 for observing the environment is performed, and the object posture database 409 can be configured to be generated/updated.

Figure 5:
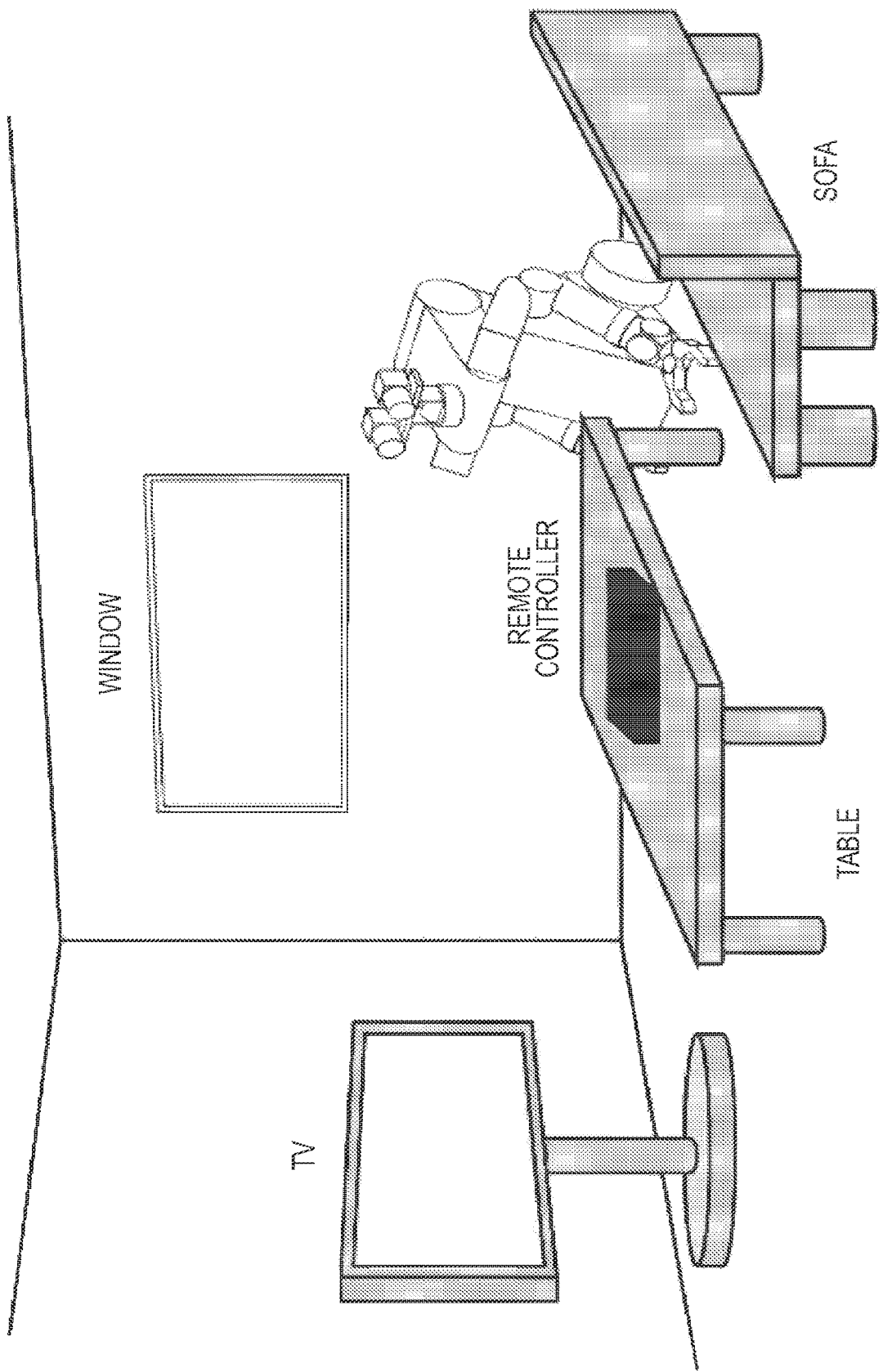
FIG. 5 is a diagram illustrating a state in which a comfortable environment for a user is arranged as an operation corresponding to an environment of the robot device 100.

FIGS. 5 and 6 illustrate a state in which a comfortable environment for the user is autonomously arranged as an operation corresponding to an environment of the robot device 100.

The robot device 100 normally observes a surrounding target object while autonomously moving around. In the examples illustrated in FIGS. 5 and 6, an environment map of a living room in which a TV, a table, and a sofa are arranged in that order is constructed and the robot device 100 autonomously moves around normally on the basis of the environment map. FIG. 5 is a perspective view of the living room, and FIG. 6 is a top view of the living room.

The robot device 100 detects a target object of a remote controller (for the TV) placed on the table, and observes the remote controller every time the robot device 100 autonomously moves around. A correct posture of the detected target object is collated with dictionary data registered in the object posture database 409. Here, when an actually observed posture of the target object is different from a collation result of the object posture database 409, the robot device 100 operates the target object or corrects the posture.

Referring to the above-described Table 1, as the collation result of the object posture database 409, a state in which buttons face upward when the remote controller is on the table, sofa, or floor and a transmitter is directed to the TV when the remote controller is close to the TV can be acquired as the correct posture of the remote controller. Referring to FIG. 6, the remote controller detected as the target object is placed on the table with the buttons facing upward. In addition, the remote controller is placed on the table close to the TV, but the transmitter is placed to be tilted from the direction of the TV. If the observed posture of the remote controller is detected to be inconsistent with the collation result indicating that "the transmitter is directed to the TV when the remote controller is close to the TV," the robot device 100 corrects the posture of the remote controller as indicated by an arrow of FIG. 6.

When a correction result of the posture of the target object by the robot device 100 is wrong, the user may correct the posture or teach the robot device 100.

In addition, if an instruction to operate the target object is received from the user, the robot device 100 places the target object in the correct (stable) posture. In this case, the correct posture when the target object is placed is collated with the dictionary data within the object posture database 409. The target object is operated and placed in the posture.

For example, if an instruction to place the remote controller on the table close to the TV is received from the user, the robot device 100 places the remote controller on the table by operating the remote controller so that the buttons face upward and the transmitter is directed to the TV as in the examples illustrated in FIGS. 5 and 6. Alternatively, when an instruction to place the mug on the table is received from the user, the robot device 100 places the mug on the table by operating the mug in a stable state in which the mug stands upright.

When an operation result of the target object by the robot device 100 according to the instruction from the user is wrong, the user may correct the posture or teach the robot device 100.

Figure 7:
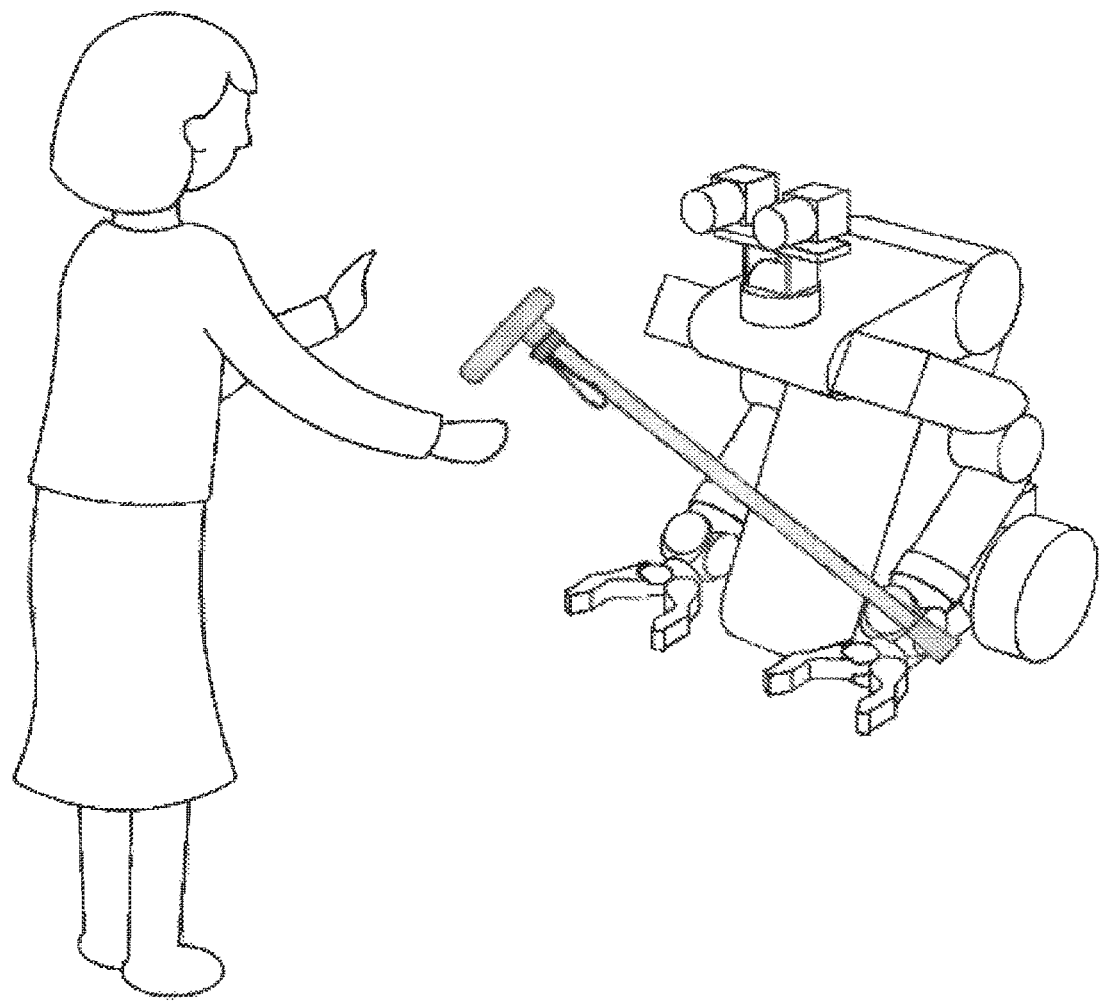
FIG. 7 is a diagram illustrating a state in which a target object is handed over in a correct posture (in which the user easily holds the target object) as an operation corresponding to an environment of the robot device 100.

In FIG. 7, a state in which a target object is handed over in a correct posture (in which the user easily holds the target object) as an operation corresponding to an environment of the robot device 100 is illustrated.

If an instruction to bring the target object is received from the user, the robot device 100 collates the correct posture when the target object is handed over with the dictionary data within the object posture database 409. The robot device 100 hands over the target object to the user after operating the target object for the correct posture described in the dictionary data.

In FIG. 7, an example of an instruction to bring a cane is illustrated. Referring to the above-described Table 2, because a state in which a handle portion is toward the user can be acquired as the correct posture of the cane as a collation result of the object posture database 409, the robot device 100 hands over the cane to the user by operating the cane so that the handle portion is toward the user.

When an operation result of the target object by the robot device 100 according to the instruction from the user is wrong, the user may correct the posture or teach the robot device 100.

As seen from FIGS. 5 and 6, the robot device 100 according to this embodiment estimates the correct posture of the target object corresponding to the environment and operates and corrects the target object so that the target object is in the correct posture, thereby autonomously arranging the comfortable environment for the user.

In addition, as seen from FIG. 7, when the target object is handed over from the robot device 100 according to this embodiment to the user, it is possible to implement natural interaction with the user by estimating an optimum posture of the target object for handing over and operating the target object so that the target object is in the optimum posture.

As described above, the robot device 100 learns a posture in which a certain object is frequently placed as an optimum posture for the object. Because the robot device 100 autonomously learns an optimum posture in terms of a surrounding object normally placed for use by the user, the robot device 100 can autonomously arrange a comfortable environment for the user by appropriately correcting the posture of the object even when the user places the object in an unusual posture. These object posture correction functions are particularly effective for users such as persons with disabilities, persons with physical disabilities, or disabled elders who normally place objects to be frequently used in personally determined positions so that the objects can be used without difficulty as well as users capable of accurately arranging goods.

Additionally, the technology disclosed in this specification may also be configured as below.

(1) A robot device including:
an environment map including surrounding environment information;
an image input unit for inputting an image of surroundings;
a target object detection unit for detecting an object from the input image of the image input unit;
an object position detection unit for detecting a position of the object detected by the target object detection unit;
an environment information acquisition unit for acquiring surrounding environment information of the position of the object detected by the object position detection unit from the environment map;
an optimum posture acquisition unit for acquiring an optimum posture corresponding to the surrounding environment information acquired by the environment information acquisition unit for the object detected by the target object detection unit;
an object posture database for retaining an optimum posture of each object for each environment;
an object posture detection unit for detecting a current posture of the object from the input image of the image input unit;
an object posture comparison unit for comparing the current posture of the object detected by the object posture detection unit to the optimum posture of the object retained in the object posture database; and
an object posture correction unit for correcting the posture of the object when the object posture comparison unit determines that there is a predetermined difference or more between the current posture of the object and the optimum posture.

(2) The robot device according to (1), further including:
a task execution unit for executing a task based on an instruction of a user,
wherein, when the task execution unit is not executing the task, the detection of the current posture of the object by the object posture detection unit, the comparison with the optimum posture by the object posture comparison unit, and the correction of the posture of the object by the object posture correction unit are autonomously performed.

(3) The robot device according to (1) or (2), further including:
a moving unit for moving a position of the robot device,
wherein the object posture detection unit detects the current posture of the object while the moving unit moves a current position of the robot device.

(4) The robot device according to any of (1) to (3), wherein the optimum posture acquisition unit acquires an optimum posture of each object by learning and retains the acquired optimum posture in an object posture database.

(5) The robot device according to (4), wherein the object posture database further retains the optimum posture of each object taught from a user.

(6) The robot device according to any of (1) to (5), further including:

an environment map update unit for updating an environment map on a basis of the input image of the image input unit.

(7) The robot device according to any of (1) to (6), wherein the optimum posture acquisition unit acquires an optimum posture for placing the object when arranging a comfortable environment for a user and an optimum posture of the object when handing the object over to the user.

(8) The robot device according to any of (1) to (7), wherein the environment information acquisition unit acquires the surrounding environment information of the position of the object detected by the object position detection unit from an environment map including the surrounding environment information.

(9) The robot device according to any of (1) to (8), wherein the object posture comparison unit compares the current posture of the object detected by the object posture detection unit to the optimum posture of the object retained in an object posture database retaining an optimum posture of each object for each environment.

(10) A method of controlling a robot device, including:

inputting an image of surroundings;

detecting an object from the image input in the step of inputting;

detecting a position of the object detected in the step of detecting an object;

acquiring surrounding environment information of the position of the object detected in the step of detecting from an environment map including the surrounding environment information;

acquiring an optimum posture corresponding to the surrounding environment information acquired in the step of acquiring surrounding environment information for the object detected in the step of detecting an object;

retaining an optimum posture of each object for each environment in an object posture database;

detecting a current posture of the object from the image input in the step of inputting;

comparing the current posture of the object detected in the step of detecting a current posture to the optimum posture of the object retained in the object posture database; and correcting the posture of the object when it is determined in the step of comparing that there is a predetermined difference or more between the current posture of the object and the optimum posture.

(11) A computer program, written in a computer-readable format, for controlling a robot device and causing a computer to function as:

an environment map including surrounding environment information;

an image input unit for inputting an image of surroundings;

a target object detection unit for detecting an object from the input image of the image input unit;

an object position detection unit for detecting a position of the object detected by the target object detection unit;

an environment information acquisition unit for acquiring surrounding environment information of the position of the object detected by the object position detection unit from the environment map;

an optimum posture acquisition unit for acquiring an optimum posture corresponding to the surrounding environment information acquired by the environment information acquisition unit for the object detected by the target object detection unit;

an object posture database for retaining an optimum posture of each object for each environment;

an object posture detection unit for detecting a current posture of the object from the input image of the image input unit;

an object posture comparison unit for comparing the current posture of the object detected by the object posture detection unit to the optimum posture of the object retained in the object posture database; and an object posture correction unit for correcting the posture of the object when the object posture comparison unit determines that there is a predetermined difference or more between the current posture of the object and the optimum posture.

(12) A robot system including:

an environment map constructed on an external device and including surrounding environment information;

an object posture database, constructed on an external device, for retaining an optimum posture of each object for each environment; and a robot device including an image input unit for inputting an image of surroundings, a target object detection unit for detecting an object from the input image of the image input unit, an object position detection unit for detecting a position of the object detected by the target object detection unit, an environment information acquisition unit for acquiring surrounding environment information of the position of the object detected by the object position detection unit from the environment map, an optimum posture acquisition unit for acquiring an optimum posture corresponding to the surrounding environment information acquired by the environment information acquisition unit for the object detected by the target object detection unit, an object posture detection unit for detecting a current posture of the object from the input image of the image input unit, an object posture comparison unit for comparing the current posture of the object detected by the object posture detection unit to the optimum posture of the object retained in the object posture database, and an object posture correction unit for correcting the posture of the object when the object posture comparison unit determines that there is a predetermined difference or more between the current posture of the object and the optimum posture.

It should be understood by those skilled in the art that various modifications, combinations, sub-combinations and alterations may occur depending on design requirements and other factors insofar as they are within the scope of the appended claims or the equivalents thereof.

Although the embodiments applied to the human type robot device with two legs have been mainly described in this specification, the subject matter of the technology disclosed in this specification is not limited thereto. The present technology can also be equally applied to a robot device with other moving means or with no moving means.

In addition, the embodiments related to the household robot have mainly been described. Of course, the present technology can also be equally applied to robot devices for various purposes including industrial robots.

Namely, the present disclosure is merely an example, and should by no means be interpreted as limited to the content disclosed in this specification. The subject matter of the present disclosure is to be discerned while taking the claims into consideration.

The present disclosure contains subject matter related to that disclosed in Japanese Priority Patent Application JP 2011-161550 filed in the Japan Patent Office on Jul. 25, 2011, the entire content of which is hereby incorporated by reference.

What is claimed is:

1. A mobile apparatus, comprising:
   circuitry configured to:
   input environment information regarding an environment of the mobile apparatus including an object and posture data of the object, including a set of coordinates of the object in the environment, to a learning model that has learned to output target posture data regarding a target posture of the object based on the inputted environment information and the posture data of the object, the learning model repeating observations of the object to obtain a plurality of sets of the coordinates of the object using the environment information and the posture data until a total number of the observations reaches a predetermined number;
   in response to the total number of the observations reaching the predetermined number, acquire the target posture data of the object from the learning model, by setting, as the target posture data, the set of the coordinates of the object having been observed a most number of times through the repeating of the observations of the object;
   acquire an image of the environment including the object;
   obtain current posture data regarding a current posture of the object based on the acquired image of the environment, the current posture data including the set of the coordinates of the object; and
   perform a process of correcting the posture of the object based on the target posture data and the current posture data by comparing the set of the coordinates of the object for the target posture data and the current posture data, such that the current posture of the object becomes closer to the target posture.

2. The mobile apparatus according to claim 1, wherein the circuitry is further configured to:
   acquire the environment information including the position of the object; and
   input the environment information on to the learning model.

3. The mobile apparatus according to claim 2, wherein the circuitry is further configured to:
   detect the position of the object from the image;
   acquire the environment information including the position of the object; and
   input the environment information to the learning model.

4. The mobile apparatus according to claim 1, wherein the learning model is updated to output the target posture data based on a frequency of combination of the environment information and the posture data of the object.

5. The mobile apparatus according to claim 1, wherein the learning model is updated to output the target posture data based on user input.

6. The mobile apparatus according to claim 1, wherein the circuitry is further configured to:
   obtain posture change data indicating an amount of a change of the posture of the object to be corrected in a case that a predetermined difference exists between the target posture data and the current posture data; and
   perform the process of correcting the posture of the object based on the posture change data.

7. The mobile apparatus according to claim 6, wherein the circuitry is further configured to:
   cause an end effector to move as the process of correcting the posture of the object based on the posture change data.

8. A method comprising:
   inputting, by circuitry of a mobile apparatus, environment information regarding an environment of the mobile apparatus including an object and posture data of the object, including a set of coordinates of the object in the environment, to a learning model that has learned to output target posture data regarding a target posture of the object based on the inputted environment information and the posture data of the object, the learning model repeating observations of the object to obtain a plurality of sets of the coordinates of the object using the environment information and the posture data until a total number of the observations reaches a predetermined number;
   in response to the total number of the observations reaching the predetermined number, acquiring, by the circuitry, the target posture data of the object from the learning model, by setting, as the target posture data, the set of the coordinates of the object having been observed a most number of times through the repeating of the observations of the object;
   acquiring an image of the environment including the object;
   obtaining, by the circuitry, current posture data regarding a current posture of the object based on the acquired image of the environment, the current posture data including the set of the coordinates of the object; and
   performing, by the circuitry, a process of correcting the posture of the object based on the target posture data and the current posture data by comparing the set of the coordinates of the object fax the target posture data and the current posture data, such that the current posture of the object becomes closer to the target posture.

9. The method of claim 8, further comprising:
   acquiring the environment information including the position of the object; and
   inputting the environment information to the learning model.

10. The method of claim 9, further comprising:
    detecting the position of the object from the image;
    acquiring the environment information including the position of the object; and
    inputting the environment information to the learning model.

11. The method of claim 8, wherein the learning model is updated to output the target posture data based on a frequency of combination of the environment information and the posture data of the object.

12. The method of claim 8, wherein the learning model is updated to output the target posture data based on user input.

13. The method of claim 8, further comprising:
    obtaining posture change data indicating an amount of a change of the posture of the object to be corrected in a case that a predetermined difference exists between the target posture data and the current posture data; and
    performing the process of correcting the posture of the object based on the posture change data.

14. The method of claim 13, further comprising:
    causing an end effector to move as the process of correcting the posture of the object based on the posture change data.

15. The mobile apparatus according to claim 1, wherein the circuitry is configured to se a posture learned flag indicating an optimum posture can be calculated by sufficiently observing the object in the environment.

16. The mobile apparatus according to claim 15, wherein the circuitry is configured to set the posture learned flag in response to determining that a total number of observation of the environment has reached the predetermined number.

17. The mobile apparatus according to claim 1, wherein the circuitry is configured to:
   determine whether a predetermined difference or more exists between the target posture data and the current posture data; and
   perform the process of correcting the posture of the object in a case where the predetermined difference or more is determined to exist between the target posture data and the current posture data.

18. The method of claim 8, further comprising:
   determining, using the circuitry, whether a predetermined difference or more exists between the target posture data d the current posture data; and
   performing, using the circuitry, the process of correcting the posture of the object in a case where the predetermined difference or more is determined to exist between the target posture data and the current posture data.

* * * * *